No. 789,612.  
PATENTED MAY 9, 1905.  
A. G. KELLEY & H. E. SKERRY.  
BUTTER WIRE.  
APPLICATION FILED MAR. 23, 1905.
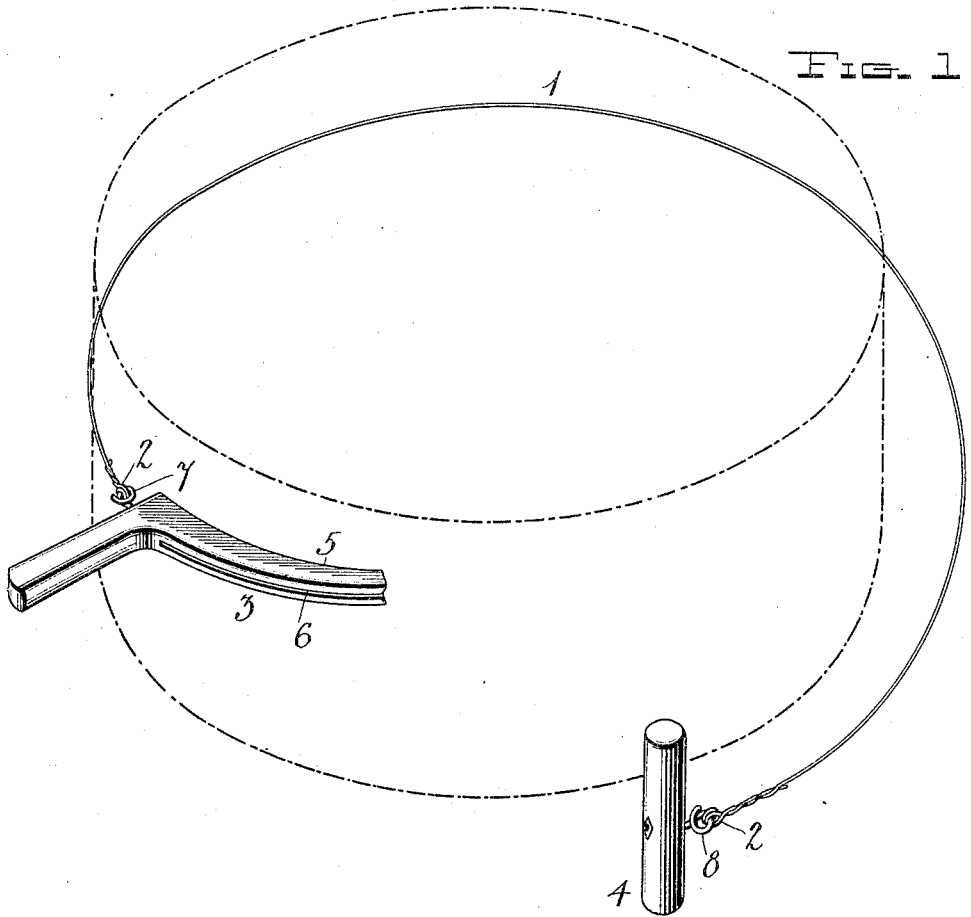
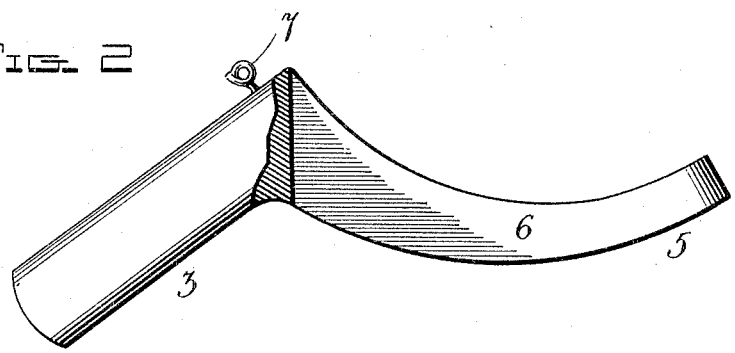
Witnesses  
Inventors  
A. G. Kelley and  
H. E. Skerry,  
by  
Attorney No. 789,612. Patented May 9, 1905.

UNITED STATES PATENT OFFICE.

ARTHUR G. KELLEY AND HILTON E. SKERRY, OF LYNN, MASSACHUSETTS.

BUTTER-WIRE.

SPECIFICATION forming part of Letters Patent No. 789,612, dated May 9, 1905.

Application filed March 23, 1905. Serial No. 251,666.

*To all whom it may concern:*

Be it known that we, ARTHUR G. KELLEY and HILTON E. SKERRY, citizens of the United States, residing at Lynn, in the county of Essex and State of Massachusetts, have invented certain new and useful Improvements in Butter-Wires; and we do declare the following to be a full, clear, and exact description of the invention, such as will enable others skilled in the art to which it appertains to make and use the same.

Our invention is an improved butter-wire for use for cutting butter; and it consists in the construction, combination, and arrangement of devices hereinafter described and claimed.

In the accompanying drawings, Figure 1 is a perspective view of a butter-wire embodying our improvements, and Fig. 2 is a detail sectional view of one of the handles.

The wire 1 may be of any suitable size and length and may be of any suitable material, but is preferably of iron or steel. Its ends are doubled and twisted to form eyes 2.

In connection with the wire we employ a pair of handles 3 4. The handle 3 is provided at one end with a curved arm 5, which is adapted to be placed against one side of the block of butter which is to be cut and is provided with a longitudinal kerf 6, which extends from its outer end to the angle formed by the junction of the arm with the inner end of the handle 3. The latter is provided near its inner end with an open screw-eye 7 for engagement with one of the eyes of the wire, so that one end of the wire may be detachably secured to the said handle 3. The handle 4 is provided at its center with an open screw-eye 8, which is adapted to coact with the eye at the other end of the wire, so that the same may be detachably connected to the handle 4.

In use the handle 3 is grasped by one hand and the handle 4 by the other. The arm 5 of the handle is placed against one side of the block of butter. The wire is passed around the block of butter and the operator then draws the handle 4 so as to cause the wire to cut through the block of butter. The kerf 6 is for the reception of the wire, so that the wire may be drawn completely across the butter and entirely sever it.

Our improved butter-wire may be very easily manipulated, and by its use the butter may be cut without the necessity of touching the butter with the hands. By providing the handle with devices whereby the ends of the wire may be adjustably connected thereto the cleansing of the implement is greatly facilitated.

Our improved butter-wire is exceedingly efficient for cutting butter when the same is very hard and will cut the same in a perfectly straight line. Furthermore, the wire can be operated to cut the butter with the application of very little strength.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described our invention, what we claim as new, and desire to secure by Letters Patent, is—

1. An implement of the class described, comprising a handle having a laterally-extending arm provided with a longitudinal kerf, a wire having one end attached to the said handle and a handle attached to the other end of the wire.

2. An implement of the class described comprising a pair of handles, one having a lateral arm provided with a longitudinal kerf, a wire and means to detachably secure the ends of the wire to the respective handles.

In testimony whereof we have hereunto set our hands in presence of two subscribing witnesses.

ARTHUR G. KELLEY.
HILTON E. SKERRY.

Witnesses:
 JAMES W. SANTRY,
 ARTHUR E. SANTRY.